(12) United States Patent
Cheon et al.

(10) Patent No.: US 10,559,807 B2
(45) Date of Patent: Feb. 11, 2020

(54) BATTERY PACK

(71) Applicant: SAMSUNG SDI CO., LTD., Yongin-si, Gyeonggi-do (KR)

(72) Inventors: Moonsoo Cheon, Yongin-si (KR); Woongbin Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 329 days.

(21) Appl. No.: 15/441,725

(22) Filed: Feb. 24, 2017

(65) Prior Publication Data

US 2017/0250395 A1  Aug. 31, 2017

(30) Foreign Application Priority Data

Feb. 29, 2016  (KR) .................. 10-2016-0024368

(51) Int. Cl.
| | |
|---|---|
| *H01M 2/34* | (2006.01) |
| *H01M 2/20* | (2006.01) |
| *H01M 2/10* | (2006.01) |
| *H01M 10/42* | (2006.01) |
| *H01M 10/48* | (2006.01) |

(52) U.S. Cl.
CPC ......... *H01M 2/348* (2013.01); *H01M 2/1022* (2013.01); *H01M 2/1077* (2013.01); *H01M 2/204* (2013.01); *H01M 10/425* (2013.01); *H01M 10/486* (2013.01); *H01M 2220/20* (2013.01); *H01M 2220/30* (2013.01)

(58) Field of Classification Search
CPC ............. H01M 10/425; H01M 10/486; H01M 2220/20; H01M 2220/30; H01M 2/1022; H01M 2/105; H01M 2/1077; H01M 2/204; H01M 2/348
See application file for complete search history.

(56) References Cited

U.S. PATENT DOCUMENTS

| | | | |
|---|---|---|---|
| 9,236,597 B2 | 1/2016 | Yoo | |
| 2012/0015215 A1* | 1/2012 | Kim | H01M 2/105 429/7 |
| 2012/0028083 A1* | 2/2012 | Jung | H01M 10/486 429/7 |
| 2012/0028084 A1* | 2/2012 | Park | H01M 2/105 429/7 |
| 2012/0129013 A1* | 5/2012 | Lee | H01M 10/4207 429/7 |
| 2012/0141839 A1* | 6/2012 | Hong | H01M 2/105 429/7 |
| 2012/0251849 A1* | 10/2012 | Park | H01M 2/105 429/7 |

(Continued)

FOREIGN PATENT DOCUMENTS

| | | |
|---|---|---|
| KR | 10-2014-0113861 | 9/2014 |
| KR | 10-2014-0116661 | 10/2014 |

*Primary Examiner* — Carlos Barcena
(74) *Attorney, Agent, or Firm* — Lee IP Law, P.C.

(57) ABSTRACT

A battery pack includes a protection circuit module for a plurality of battery cells arranged in parallel in a case. The protection circuit module includes a temperature sensor. An insertion area is at a location of the case corresponding to the temperature sensor and includes a removed part of the case. The temperature sensor extends through the insertion area to contact an outer surface of at least one of the battery cells.

11 Claims, 5 Drawing Sheets

(56) References Cited

U.S. PATENT DOCUMENTS

| | | | | |
|---|---|---|---|---|
| 2013/0196180 A1* | 8/2013 | Kim | ................... | H01M 2/1055 |
| | | | | 429/7 |
| 2014/0017519 A1* | 1/2014 | Park | ....................... | H01M 2/34 |
| | | | | 429/7 |
| 2014/0342191 A1* | 11/2014 | Shin | ................. | H01M 10/4257 |
| | | | | 429/7 |
| 2016/0079638 A1* | 3/2016 | Chu | ................... | H01M 10/637 |
| | | | | 429/62 |

\* cited by examiner

BATTERY PACK

CROSS-REFERENCE TO RELATED APPLICATION

Korean Patent Application No. 10-2016-0024368, filed on Feb. 29, 2016, and entitled, "Battery pack," is incorporated by reference herein in its entirety.

BACKGROUND

1. Field

One or more embodiments relate to a battery pack.

2. Description of the Related Art

Battery cells are used to power a variety of electronic systems. A single battery cell may power mobile phones and other portable devices. Multiple battery cells may power an electric or hybrid vehicle. The battery cells may be included in a battery pack.

In a battery pack, adjacent battery cells are electrically connected to each other using a connection tab. Various protection devices may also be included for safety. For example, a sensor may be included to measure the temperature of a battery cell. When the temperature increases, the protection device may block current from flowing in or from the battery pack to prevent the battery pack from overheating or igniting.

SUMMARY

In accordance with one or more embodiments, a battery pack including a plurality of battery cells arranged in parallel in a length direction, each of the battery cells including ends with electrode regions; a holder case accommodating the battery cells; and a protection circuit module on an outer surface of the holder case and including a temperature sensor extending from a region facing the holder case, wherein an insertion area is at a location of the holder case which corresponds to the temperature sensor and wherein the insertion area includes a removed part of the holder case, the temperature sensor extending through the insertion area to contact an outer surface of at least one of the battery cells.

The temperature sensor may be between the holder case and the outer surfaces of the battery cells. An interval, between the holder case and the outer surface of at least one of the battery cells where the temperature sensor is located, may vary. An interval between the case and an outer surface of at least one of the battery cells adjacent to the insertion area may be greater than the interval between the holder case and the outer surface of the at least one battery cell where an end of the temperature sensor is located. The temperature sensor may be a flexible printed circuit board (FPCB) type.

The case may be on side surfaces of the battery cells and extend to circumferences of the electrode regions, and the case may be bent from the side surfaces to the electrode regions at the ends of the battery cells. The case may include an exposing portion corresponding to a removed region of the holder case, and the removed region of the holder case may correspond to the temperature sensor. The exposing portion may be covered by a hinge portion, and the hinge portion may include a hole portion that opens a region where the temperature sensor contacts the one least one of the battery cells.

The battery pack may include a connection tab adjacent the electrode regions of the battery cells, to electrically connect the battery cells to each other; and an insulation area over the connection tab.

In accordance with one or more other embodiments, a battery pack includes battery cells; a case for the battery cells; and a temperature sensor extending through a hole in the case to contact an outer surface of at least one of the batteries, wherein a portion of the temperature sensor extending through the hole is between the case and the outer surface of at least one of the batteries and has a shape. The portion of the temperature sensor may extend through the hole conforms to a shape of the outer surface of at least one of the batteries. The shape may be curved. The battery pack may include a protection circuit over the batteries and the temperature sensor may extend from the protection circuit. A size of a space between the case and the portion of the temperature sensor extending through the hole varies. The battery pack may include a hinged surface adjacent to the hole.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments, or certain aspects thereof, may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be, present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
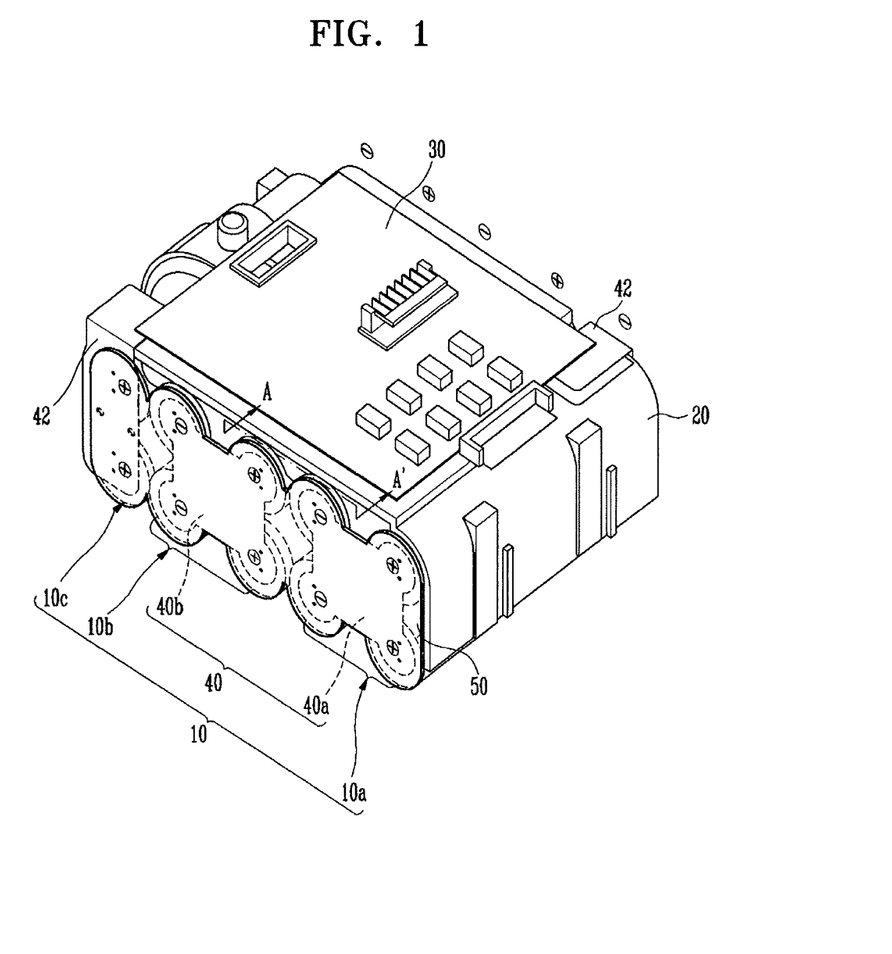
FIG. 1 illustrates an embodiment of a battery pack.
Figure 2:
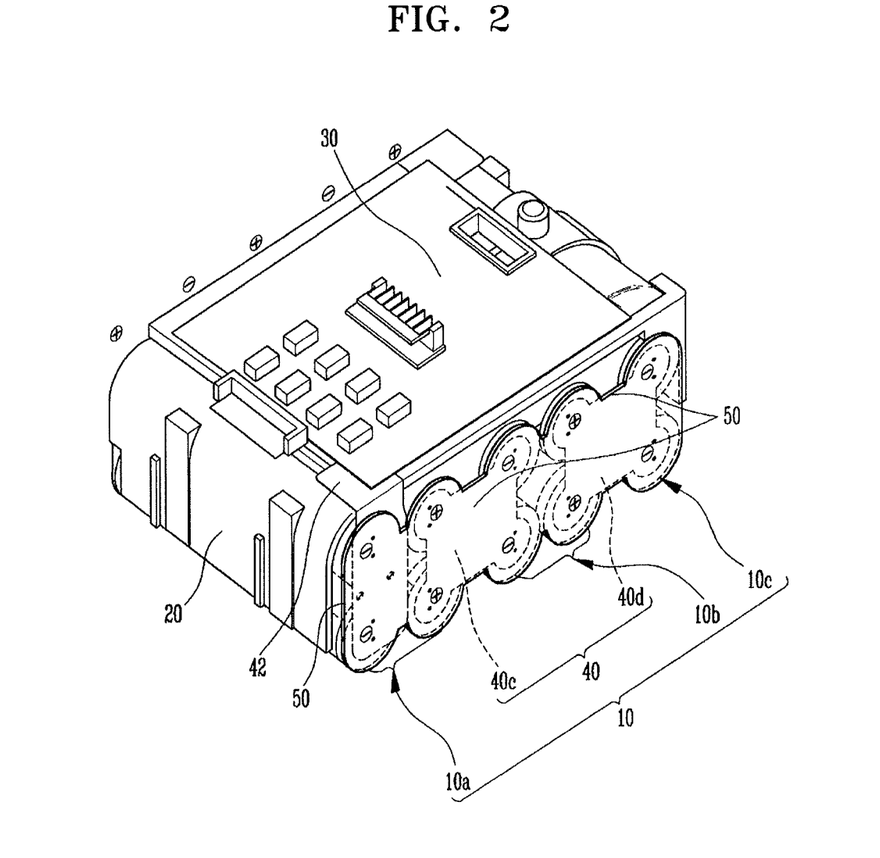
FIG. 2 illustrates another view of the battery pack.
Figure 3:
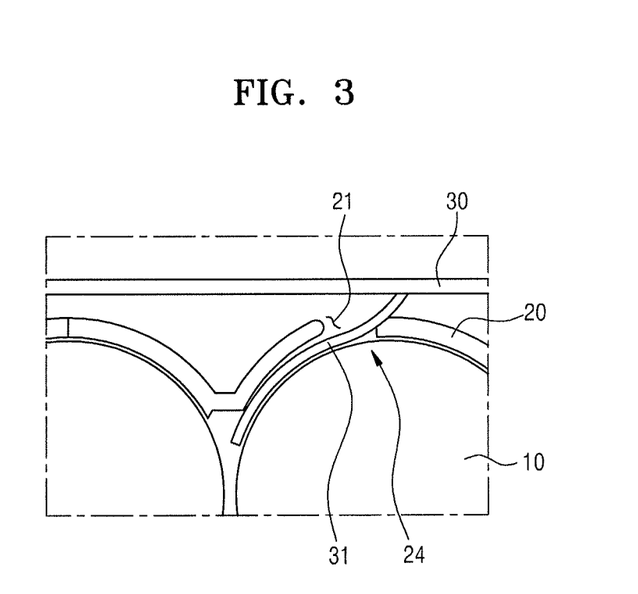
FIG. 3 illustrates a view taken along section line A-A' in FIG. 1.

FIG. 1 illustrates an embodiment of a battery pack, FIG. 2 is a rear perspective view of the battery pack, and FIG. 3 illustrates a cross-sectional view taken along line A-A' in FIG. 1.

Referring to FIGS. 1 through 3, the battery pack includes a plurality of battery cells 10, a holder case 20 to accommodate the battery cells 10, a protection circuit module 30, and connection tabs 40 electrically connecting the battery cells 10. The protection circuit module 30 is mounted on an outer surface of the holder case 20, and may include a temperature measuring device (e.g., a temperature sensor) 31 extending from one region facing the holder case 20. The battery cells include battery cells 10*a*, 10*b*, 10*c* at different locations, and connection tabs 40 include connection tabs 40*a*, 40*b*, 40*c*, 40*d* at different locations.

Each of the battery cells 10 includes electrode units (e.g., electrode regions) at respective ends. The battery cells 10 may be arranged parallel to each other in a length direction. Each of the battery cells 10 may be a cylindrical battery cell to be charged and discharged. In one embodiment, the battery cells 10 have a 5-series, 2-parallel (5S×2P) structure, e.g., 5 groups of two battery cells 10 connected in parallel may be connected in series by the connection tabs 40. The connection tabs 40 may be a conductive device made of, for example, copper, to electrically connect the groups of battery cells 10.

An embodiment of a connection relationship of the groups of battery cells 10 will now be described. The two battery cells 10 are connected in parallel. Each of the battery cells 10 may have a first polarity at one end (e.g., a first end) and a second polarity at the other end, e.g., a second end. The first polarity of each of the battery cells 10 may be electrically connected to the protection circuit module 30 through one of the connection tabs 40. The second polarity of each of the battery cells 10 may be electrically connected in series to the first polarity of a neighboring one of the battery cells 10 through one of the connection tabs 40.

The total 5 groups of the battery cells 10 are connected in series. The second polarity end of the last battery cells 10 may be electrically connected to the protection circuit module 30 through one of the connection tabs 40. In the current embodiment, the battery cells 10 have a 5S×2P structure. The battery cells 10 may have a different structure in another embodiment.

The battery cell 10 may include an electrode assembly, which includes a positive current collector, a negative current collector, and a separator between the positive and negative current collectors. The electrode assembly may also include a positive electrode terminal and a negative electrode terminal exposed at respective ends and connected to the electrode assembly. Such positive and negative electrode terminals may correspond to an electrode unit according to an embodiment.

According to an embodiment, reference numeral 42 denotes a (+) high current tab and (−) high current tab and indicates a power supply unit at respective ends of the battery cells 10 connected in series and parallel. For example, the (+) high current tab is a positive power supply unit corresponding to a highest electric potential end. The (−) high current tab is a negative power supply unit corresponding to a lowest electric potential end. The protection circuit module 30 may include a through hole through which the (+) high current tab and (−) high current tab 42 penetrates and soldered.

The holder case 20 may be on side surfaces of the battery cells 10 and extend up to a circumference of the electrode unit. In one embodiment, the holder case 20 may be bent from the side surfaces to the electrode units at respective ends of the battery cells 10. The holder case 20 may protect the battery pack from an external shock, a fall, and vibration, and thus may increase durability.

The protection circuit module 30 is on an outer surface of the holder case 20, and may include the temperature measuring device 31 extending from one region facing the holder case 20. The protection circuit module 30 may include various electronic components of or including a protection circuit. The protection circuit module 30 may be screwed to the holder case 20 or may be fixed to the holder case 20 using another coupling device. The temperature measuring device 31 may, for example, contact an outer surface of the battery cell 10. For example, the temperature measuring device may be mounted on an outer circumferential surface of a battery cell by being inserted through an insertion portion, e.g., described below.

The protection circuit module 30 includes a terminal to be connected to each battery cell 10. Each battery cell 10 may be connected to a terminal in the protection circuit module 30 through the connection tab 40 that operates as an electric wire, e.g., a nickel tab.

An insertion portion (e.g., insertion area) 21 may be on the holder case 20 at a location corresponding to the temperature measuring device 31. The insertion portion 21 may be formed by removing part of the holder case 20. When the temperature measuring device 31 is inserted through the insertion portion 21, one end of the temperature measuring device 31 may be mounted on an outer circumferential surface of the battery cell 10. By inserting one end of the temperature measuring device 31 into the insertion portion 21, assembly is simplified and productivity of the battery pack may be increased.

The temperature measuring device 31 may be between the holder case 20 and the outer circumferential surface of the battery cell 10. An interval between the holder case 20 and the outer circumferential surface of the battery cell 10 where the temperature measuring device 31 is located may vary. In one embodiment, an interval between the holder case 20 and the outer circumferential surface of the battery cell 10 adjacent to the insertion portion 21 may be larger than an interval between the holder case 20 and the outer circumferential surface of the battery cell 10, where an end of the temperature measuring device 31 is located.

Forming the interval between the holder case 20 at the insertion portion 21 and the battery cell 10 to be larger may allow the temperature measuring device 31 to be easily inserted into the insertion portion 21 of the holder case 20. Also, forming the interval between the holder case 20, at a side where the end of the temperature measuring device 31 is located, and the battery cell 10 to be smaller may prevent the end of the temperature measuring device 31 from moving. The temperature measuring device 31 may be, for example, a flexible printed circuit board (FPCB) type. Accordingly, the temperature measuring device 31 may be easily adhered along the outer circumferential surface of the battery cell 10.

When the interval between the holder case 20 at the insertion portion 21 and the battery cell 10 is too large, the temperature measuring device 31 may not be adhered to the outer circumferential surface of the battery cell 10, and thus may be within an available error range.

The battery pack of a portable electronic device (e.g., a laptop computer) may connect a plurality of batteries, in parallel or series, in order to have a certain voltage and current. These batteries may be assembled to have a certain shape. When the temperature of a battery cell is too high (e.g., above a predetermined threshold), the battery cell may be damaged. In addition, the battery may explode, thereby damaging a system receiving power from the battery cell. Thus, when power is supplied to the system from the battery cell, the temperature of the battery cell may be controlled.

Examples of a temperature measuring device used in a battery pack include but are not limited to a thermistor for detecting a temperature determined as a charge finishing condition, a thermostat that blocks a circuit when a battery cell reaches a certain temperature or higher and connects the circuit when a temperature of the battery cell is lower than or equal to the certain temperature, a thermal fuse that blocks a circuit when a temperature of a battery cell is equal to or higher than a certain temperature, and a positive temperature coefficient device that rapidly increases resistance when a temperature of a battery cell is equal to or higher than a certain temperature.

When a temperature measuring device is not adhered to a battery cell, temperature may not be able to be accurately measured, even when the battery cell malfunctions. Also, information about the temperature of the battery cell may be transmitted to a protection circuit too late. Thus, the protection circuit may not be able to operate rapidly enough to be effective.

Accordingly, according to an embodiment, the temperature measuring device 31 that extends from one surface of the protection circuit module 30 is inserted through the insertion portion 21 of the holder case 20. Thus, the temperature measuring device 31 is mounted on the outer circumferential surface of the battery cell 10 without having to use a separate feature, e.g., adhesive or tape.

The temperature measuring device 31 may include a semiconductor material, formed, for example, by mixing and sintering two or three types of oxides (e.g., cobalt, copper, manganese, iron, nickel, and titanium oxides), in order to have a predetermined resistivity and temperature coefficient. In one embodiment, the temperature measuring device 31 may have a negative resistance temperature coefficient, where resistance decreases as temperature increases (unlike a general metal) and thus may be distinguished as a negative temperature coefficient (NTC) or thermistor. In one embodiment, the temperature measuring device 31 may have a positive resistance temperature coefficient, where resistance increases as temperature increases and thus may be distinguished as a positive temperature coefficient (PTC).

Such a temperature measuring device 31 may have low thermal capacity, and rapid resistance changes may occur even when temperature slightly changes. Thus, the temperature measuring device 31 may be used as a temperature controlling sensor. In one embodiment, the temperature measuring device 31 may include a temperature sensor and a transmitter. The temperature sensor may be at an end of a support body. The transmitter may transmit information sensed by the temperature sensor to the protection circuit module 30.

The temperature measuring device 31 may be connected to the protection circuit module 30, for example, through a patterned wire. The protection circuit module 30 may include a controller (e.g., a micro-computer (Micom)) which receives electrical signals indicative of various characteristics of the battery cell 10. The characteristics may include, for example, voltages and/or currents of the battery cell 10. The Micom may generate control signals for protecting the battery cell 10.

Figure 4:
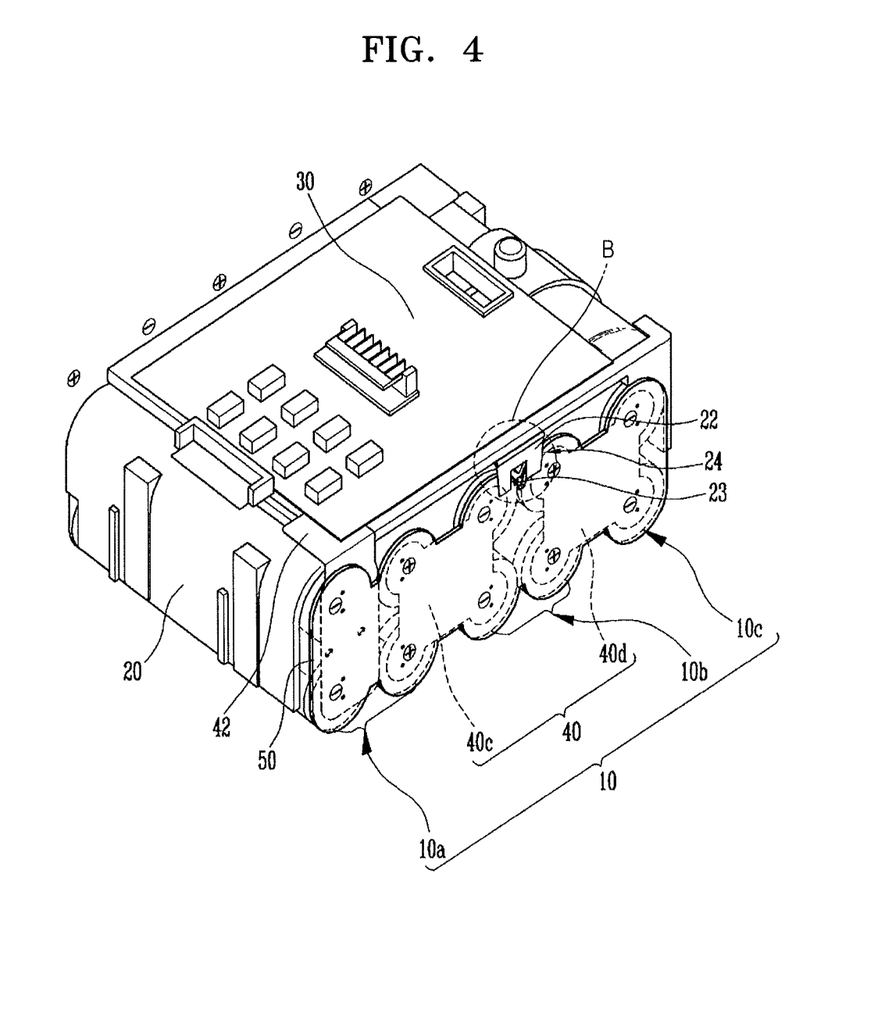
FIG. 4 illustrates another embodiment of a battery pack.
Figure 5:
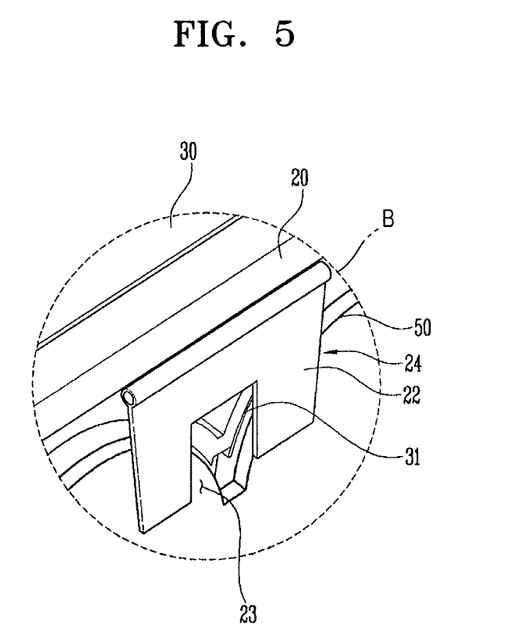
FIG. 5 illustrates an enlarged view of portion B in FIG. 4.

FIG. 4 illustrates another embodiment of a battery pack, and FIG. 5 illustrates an enlarged view of portion B in FIG. 4. Referring to FIGS. 4 and 5, the holder case 20 is located on a circumference of the electrode unit of the battery cell 10. The holder case 20 may include an exposing portion 24, obtained, for example, by removing a region of the holder case 20 corresponding to the temperature measuring device 31. The exposing portion 24 may be covered, for example, by a hinge portion 22 which may include a hole portion 23 that exposes a region where the temperature measuring device 31 is mounted on the battery cell 10.

Accordingly, the hole portion 23 may allow a determination to be easily made as to whether the temperature measuring device 31 is adhered to the battery cell 10. When the temperature measuring device 31 is not in contact with the battery cell 10, the hinge portion 22 may be opened and the mounting location of the temperature measuring device 31 may be accurately adjusted.

In this regard, the exposing portion 24 has purpose to expose the temperature measuring device 31 and to adjust the location of the temperature measuring device 31 to be adhered to the battery cells. Here, the exposing portion 21 may expose entirety of the temperature measuring device 31 or at least almost portion of the temperature measuring device 31 for location adjustment of the temperature measuring device 31. For location adjustment of the temperature measuring device 31, the hinge portion 22 may be opened and location of the temperature measuring device 31 may be accurately adjusted by way of the exposing portion 24. Meanwhile, the hole portion 23 has purpose to expose the temperature measuring device 31 and to check if the temperature device 31 is adhered to the battery cell 10. Here, the hole portion 23 may expose only a part of the temperature measuring device 31 as long as the hole portion 23 may allow view toward location of temperature measuring device 31 to determine as to whether the temperature measuring device 31 is adhered to the battery cell 10. The hole portion 23 may allow check on location of the temperature measuring device 31 without opening the hinge portion 22. If adjustment of the location of the temperature measuring device 31 is needed, then, the hinge portion 22 may be opened and the location of the temperature measuring device 31 may be accurately adjusted by way of the exposing portion 23.

Because the temperature measuring device 31 of the protection circuit module 30 is inserted into the insertion portion 21 of the holder case 20, the temperature measuring device 31 may be adhered to the battery cell 10 without having to use a separate feature. Accordingly, heat generated in the battery cell 10 may be accurately detected, thereby increasing safety of the battery pack.

A connection tab 40 may be formed at the electrode unit of the battery cell 10, to electrically connect the battery cell 10 to another battery cell 10. An insulating unit 50 may be formed over the connection tab 40.

The batteries may be cylindrical secondary batteries. In one embodiment, the batteries may be secondary batteries having a different shape, e.g., can or pouch shape. In one embodiment, batteries of different shapes may be used, e.g., one or more of these different shape batteries may be used with one or more cylindrical secondary batteries.

In accordance with one or more of the aforementioned embodiments, a temperature measuring device contacts an outer surface (e.g., outer circumferential surface) of a battery cell by inserting a thermistor into an insertion portion of a holder case. As a result, reliability of temperature measuring of the battery cell may be increased and the assembly process may be simplified, thereby increasing productivity.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A battery pack, comprising:
a plurality of battery cells arranged in parallel in a length direction, each of the battery cells including ends with electrode regions;
a holder case including an inner space accommodating the battery cells;
a protection circuit module on an outer surface of the holder case and in an outer space of the holder case; and
a temperature sensor extending from a region facing the holder case, wherein:
an insertion area is at a location of the holder case which corresponds to the temperature sensor and wherein the insertion area includes a removed part of the holder case, the temperature sensor passing through the insertion area of the holder case and between the holder case and an outer surface of at least one of the battery cells to contact the outer surface of the at least one of the battery cells,
the temperature sensor extends from the outer surface of the at least one of the battery cell in the inner space of the holder case to the protection circuit module in the outer space of the holder case through the insertion area of the holder case, and
an interval between the holder case and the outer surface of the at least one of the battery cells where the temperature sensor is located varies.

2. The battery pack as claimed in claim 1, wherein an interval between the holder case and an outer surface of at least one of the battery cells adjacent to the insertion area is greater than the interval between the holder case and the outer surface of the at least one of the battery cells where an end of the temperature sensor is located.

3. The battery pack as claimed in claim 1, wherein the temperature sensor is a flexible printed circuit board (FPCB) type.

4. The battery pack as claimed in claim 1, wherein:
the holder case is on side surfaces of the battery cells and extends to circumferences of the electrode regions, and the holder case is bent from the side surfaces to the electrode regions at the ends of the battery cells.

5. The battery pack as claimed in claim 4, wherein:
the holder case on the circumferences of the electrode regions includes an exposing portion corresponding to the removed part of the holder case, and
the removed part of the holder case corresponds to the temperature sensor.

6. The battery pack as claimed in claim 5, wherein:
the exposing portion is covered by a hinge portion, and
the hinge portion includes a hole portion that opens a region where the temperature sensor contacts the one least one of the battery cells.

7. The battery pack as claimed in claim 1, further comprising:
a connection tab adjacent the electrode regions of the battery cells, to electrically connect the battery cells to each other; and
an insulation area over the connection tab.

8. A battery pack, comprising:
a plurality of battery cells;
a case for the battery cells; and
a temperature sensor extending through a hole in the case at an outer surface of at least one of the battery cells to contact the outer surface of the at least one of the battery cells, wherein a portion of the temperature sensor extending through the hole is between the case and the outer surface of the at least one of the battery cells and has a shape;
wherein an interval between the case and the outer surface of the at least one of the battery cells where the temperature sensor is located varies.

9. The battery pack as claimed in claim 8, wherein the portion of the temperature sensor extending through the hole conforms to a shape of the outer surface of the at least one of the battery cells.

10. The battery pack as claimed in claim 9, wherein the shape of the outer surface of the at least one of the battery cells is curved.

11. The battery pack as claimed in claim 8, further comprising a protection circuit adjacent to the battery cells, wherein the temperature sensor extends from the protection circuit.

* * * * *